Figure 1:
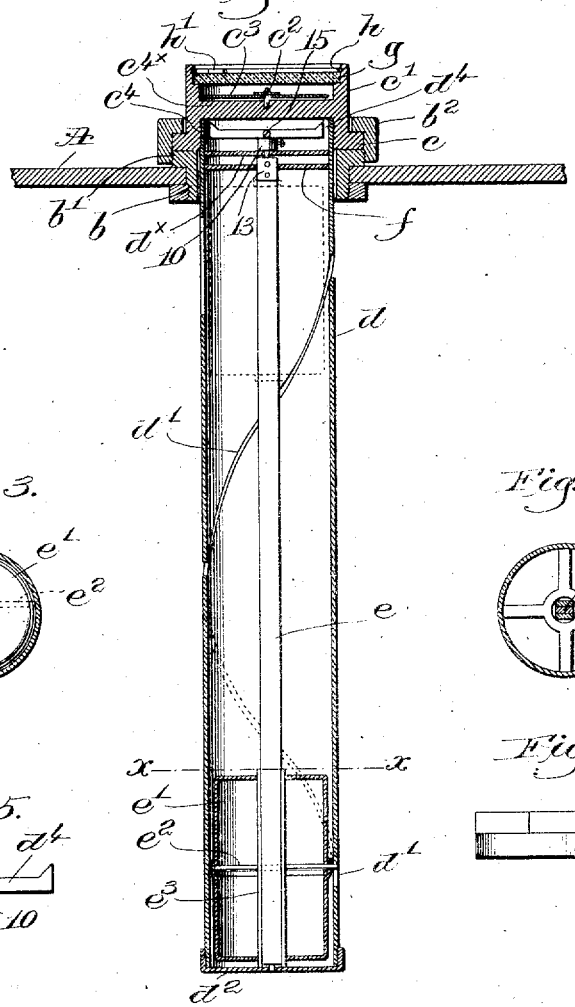

No. 12,686. REISSUED AUG. 27, 1907.

M. MARTIN.

FLUID GAGE.

APPLICATION FILED MAY 22, 1907.

Witnesses.
Thomas J. Drummond.
Joseph M. Ward.

Inventor.
Morris Martin,
by Crosby & Gregory Attys.

UNITED STATES PATENT OFFICE.

MORRIS MARTIN, OF MALDEN, MASSACHUSETTS, ASSIGNOR, BY MESNE ASSIGNMENTS, TO BOSTON AUTO GAGE COMPANY, OF BOSTON, MASSACHUSETTS, A CORPORATION OF MASSACHUSETTS.

FLUID-GAGE.

No. 12,686. Specification of Reissued Letters Patent. Reissued Aug. 27, 1907.

Original No. 794,675, dated July 11, 1905, Serial No. 233,329. Application for reissue filed May 22, 1907. Serial No. 376,176.

*To all whom it may concern:*

Be it known that I, MORRIS MARTIN, a citizen of the United States, and a resident of Malden, in the county of Middlesex and State of Massachusetts, have invented an Improvement in Fluid-Gages, of which the following description, in connection with the accompanying drawing, is a specification, like letters on the drawing representing like parts.

This invention, relating to fluid-gages, has for its object to simplify the construction of the same and produce a gage capable of quick application to a tank containing gasolene, oil, water, or other fluid the quantity of which in the tank it is desirable to be able to readily determine.

Figure 3:
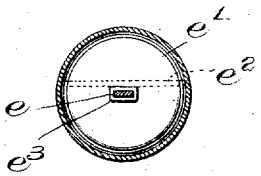
Figure 4:
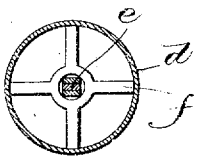
Figure 5:
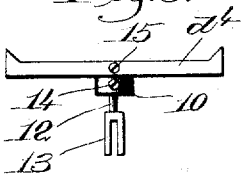
Figure 6:
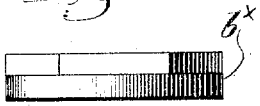
Figure 2:
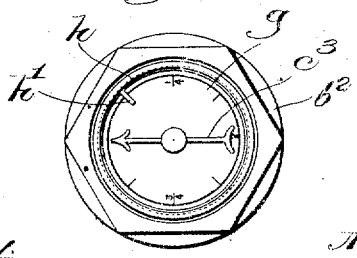

Figure 1 in section shows part of a tank or vessel to contain the fluid the quantity of which it is desired to determine; Fig. 2 is a top or plan view of the gage; Fig. 3 is a section on line $x$, above the float, showing in dotted lines the pin connected therewith that travels in the slot of the float-guiding means; Fig. 4 is a section of the float-guiding means or tube and shaft below the magnet to show the stop; Fig. 5 shows the collar, magnet, and fork detached; and Fig. 6 shows the cap which may be used to close the opening in the curb leading into the tank when the gage is not to be used.

In the drawings, A represents part of a tank or vessel to contain gasolene or other fluid the quantity of which is to be determined. The tank has an open-centered bushing $b$ secured thereto gas and fluid tight, said bushing being threaded at $b'$ to be engaged by a ring nut $b^2$ (shown as having an inturned flange) to overlap a flange $c$ of a head or compass-box $c'$, having a pivot $c^2$, on which is mounted a magnetic needle $c^3$.

The head is shown as threaded, as at $c^4$, to receive the upper end of a float guide, shown as a tube $d$ provided with a float-guideway (shown as a spiral slot $d'$) in the tube. The lower end of this tube is closed by a cap $d^2$ for guiding the lower end of a rock shaft $e$ made as a thin metal ribbon flattened at two sides, see Fig. 3. The upper end of the shaft enters a fork 13, provided with a journal or extension 12, that is extended upwardly through a hole in a top plate $d^\times$, and the extension has fitted to it above said plate a collar 10, adjustably sustained thereon by a set-screw 14. The upper end of the extension receives and sustains a permanent magnet $d^4$, the latter being adjustably secured thereto by a set-screw 15, the magnet in its rotation through the rising and falling of the float, to be described, being revolved close to the under side of the division wall $c^{4\times}$ of the compass-box. The distance between the under side of the collar 10 and the shoulder of the fork is greater than the thickness of the plate $d^\times$ so that the shoulder is out of contact with the under side of the plate $d^\times$.

The magnetic needle and the magnet are physically unconnected one with the other; but the magnetic force of the magnet acting upon the magnetic needle turns the needle in unison therewith, so that the magnet holds the magnetic needle in alinement with it, the magnet, which is concealed in the head being revolved by the rise and fall of the float $e'$ resting on the fluid in the tank.

By securing the magnet to the extension adjustably by the screw, as stated, the magnet may be adjusted as required on or with relation to the shaft to adapt the needle to coact properly with the float when the latter, for instance, occupies its position at the bottom of the tube. The collar 10 resting on the top plate $d^\times$ sustains the weight of the shaft and magnet and obviates wearing away the guide plate $d^2$ by the shaft $e$ as would be the case if the weight of the shaft and magnet was sustained by said guide plate.

The ribbon-shaft $e$ is surrounded by a float $e'$, comprising a two-part shell of very thin metal, preferably about .002 of an inch in thickness, and a flattened tube $e^3$, the tube and shell being soldered together air and fluid tight, so that said float has great buoyancy, as is necessary in connection with gasolene, which is so much lighter than water.

The head or compass-box of the gage is placed on the bushing and is then adjusted and clamped where it belongs by the ring-nut $b^2$. The head or compass-box with its attached tube and float may be removed, if necessary, from the bushing and taken out of the tank by first running off the ring-nut. The bushing may be closed tight at any time—as, for instance, if a manufacturer of automobile-tanks does not wish to furnish a gage with the tank he may close the bushing $b$ by means of a cap $b^\times$. (Shown detached in Fig. 6.)

The float has an extended pin $e^2$, and inasmuch as the metal comprising the float is so very thin I find it of advantage to use a long pin and extend the same through the shell of the float, the pin crossing one of the sides of the flattened tube, (see Fig. 3,) one end of the pin projecting far enough to enter the slot $d'$ in the tube.

I have provided the tube with a stop $f$, so located with relation to the upper end of the spiral slot $d'$ as to arrest the float in its rising movement just as or before the pin $e^2$ of the float meets the upper end of the slot.

In case the tank with which the described gage is to be used is to present an air-space above the level of the fluid therein to contain compressed air, it is necessary to have some provision to guide the person filling the tank, that an undue quantity of gasolene may not be put into the tank by careless filling, for an excess of gasolene is detrimental to the proper working of the automobile.

To provide means whereby the party filling the tank may know when the tank has been filled to the desired point, which for the sake of illustration herein I have selected as between full and three-fourths full, I have added to the gage above the glass $g$ an adjustable indicator $h$, having a finger $h'$, which may be changed in its position so that the finger may be located at just the point where the magnetic needle should be stopped when the proper amount of gasolene has been put into the tank. By the use of this gage a person filling the tank may know just when to stop filling, and if the tank is filled with as much gasolene as will raise the float and move the magnetic needle beyond the position occupied by the finger then the owner of the automobile should not pay for the extra amount of gasolene, which is really detrimental to the proper running of his machine. Further, if the filling-point is once established and a person after a ride brings his automobile in and it indicates through the magnetic needle that the tank is one-fourth full the owner may merely make a note of the position of the needle when the automobile was brought in, and he cannot be charged for more gasolene than to move the needle from the one-fourth to the established filling-point.

Having described my invention, what I claim as new, and desire to secure by Letters Patent is:—

1. In a fluid-gage, a tank, a bushing sustained thereby, a head having a pivot, a magnetic needle mounted thereon a float-guide depending below said head, a rock-shaft having a magnet secured to its upper end, a float controlled by said float-guide to turn said shaft, and a ring-nut to clamp the head on said bushing in any position in which it may be set when adjusting said head and magnet on said bushing.

2. In a gage of the class described, a spirally-slotted guide-tube, a rock-shaft sustained therein, a thin sheet-metal float located inside of said guide-tube, said sheet-metal float comprising a two-part hollow shell, and a central tube, said float having a pin extended therethrough and entering the slot in the guide-tube.

3. In a gage of the class described, a slotted guide-tube, a rock-shaft sustained therein, a hollow shell having a central tube embracing loosely said rock-shaft, said shell having a pin extended through a part of said shell and crossing one side of said tube, the end of the pin entering the slot in the guide-tube.

4. In a fluid-gage, a float guide provided with a plate in the upper portion thereof, a gage head having a magnetic needle and disposed above said plate, a shaft sustained in said float guide by said plate, a permanent magnet mounted at the upper end of said shaft in said gage head, and a float engaging said shaft and guided and turned by said float guide in the rising and falling movement of the float due to changes in the fluid level.

5. In a fluid gage, a head chambered at its upper end, a tube connected with the lower end of said head and extended downwardly therefrom, a shaft sustained in said tube, a magnet connected with said shaft, a magnetic needle pivoted in the chamber at the upper end of said head, and a float having a projection coacting with said tube and embracing said shaft, the said parts so constructed that said shaft and its magnet are turned by said tube as the float rises and falls in said tube due to change of level of fluid sustaining said float, the magnet carried by said shaft correspondingly turning the magnetic needle pivoted at the upper end of said head.

6. In a fluid-gage, a head chambered at its upper end and having a recess at its underside, a tube connected to the underside of said head, a shaft sustained in said tube, a permanent magnet connected to said shaft and revoluble in the recess at the underside of said head, a plate in said tube below said permanent magnet, a magnetic needle or member physically unconnected with said magnet and mounted in the chamber at the upper side of said head, a float located within and coacting with said tube and shaft, said parts so constructed as to rotate said shaft and with it the permanent magnet as the float rises and falls due to variations in the fluid level.

7. In a fluid-gage, the combination with a bushing adapted to be applied to a tank, of an impervious head to close the opening in said bushing fluid tight, a tube connected with the underside of said head, a shaft within said tube, a permanent magnet carried by said shaft, a float intermediate said shaft and tube and coacting therewith, the said parts so constructed that said magnet and shaft are revolved by said float as the latter rises and falls in said tube, and a pivoted magnetic member or needle physically unconnected with said magnet and mounted at the upper side of said head, said magnet as it is revolved by said shaft causing the magnetic member or needle at the outer side of said head to take positions corresponding with the positions of said magnet.

8. In a fluid gage, the combination with a fluid-holding tank, and a bushing having an opening leading thereinto, of a chambered head to close said opening fluid-tight, a float-guiding tube connected with the underside of said head and adapted to be inserted inside said tank through said bushing, a shaft inside said float-guiding tube provided at its upper end with a magnet, a float within said tube and surrounding said shaft, said float coacting with said float-guiding tube, and shaft and said parts so constructed as to turn said shaft and its connected magnet as the float rises and falls in said tube, a magnetic needle pivoted at the upper side of said head, and physically unconnected with said magnet, the rotation of the magnet causing the needle to take positions parallel with said magnet thereby to indicate variations in the level of fluid in said tank.

9. In a fluid-gage, the combination with the bushing of a fluid-tank provided with a circular opening, of a head to close said opening, means for clamping the head upon the bushing, a magnetic portion mounted at the outer side of said head, a float guide attached to the under side of said head and adapted to be inserted through said circular opening, a second magnetic portion physically unconnected with said first magnetic portion and pivoted at the upper end of said float guide below said outside magnetic portion, a float within the float guide means connecting the said float with said second magnetic portion to rotate the same and cause said outside magnetic portion to take positions corresponding with said second magnetic portion and thereby indicate variations in the fluid in said tank.

10. In a fluid-gage, a bushing adapted to be attached to a tank, a head to serve as a closure for the opening in the bushing, a slotted tube connected with said head and provided at its upper end with a bearing, a shaft, a magnet connected with the upper end of said shaft above said bearing, a hollow impervious float sealed against the admission of fluid and located wholly inside said tube, said float being provided with a pin extending therethrough and entering said slot, said shaft, slotted tube and float being constructed in a manner to rotate said shaft and its magnet, combined with a pivoted magnetic needle exposed at the upper side of said head and rotated in unison with said magnet by the attractive force of the latter, as and for the purpose described.

11. In a fluid-gage, an impervious head, a horizontally revoluble exposed magnetic needle mounted in said head, a tube connected with said head, a shaft sustained by said tube and provided at its upper end with a permanent magnet physically unconnected with said exposed magnetic needle and a float contained wholly inside said tube and connected with said shaft and coacting with said tube, said parts so constructed as to rotate the shaft and magnet in a horizontal plane and cause the exposed magnetic needle to take positions corresponding to the positions of said magnet, and a plate in the upper end of said tube below the magnet, said plate sustaining the shaft and the weight of the magnet.

12. In a fluid-gage of the class described, a thin sheet-metal hollow float having an externally-projecting guiding-pin, a tube having a spiral guideway, a plate at the upper end of said tube, a ribbon shaft sustained by said plate in said tube and provided at its upper end with a magnet, and a pivoted magnetic needle above said magnet controlled as to its movement by the movement of the magnet, said pin entering the guideway of the tube, the float as it rises and falls turning the shaft carrying the magnet and with it the magnetic needle.

13. In a gage of the class described, a chambered head, a slotted tube to enter a tank, said slotted tube being connected to the under side of the chambered head, a vertical shaft sustained within said tube, a permanent magnet connected with and rotated by said shaft, a hollow sheet-metal float within said tube and engaging said shaft, a pin extended from said float entering the slot of said tube in a manner to turn said shaft and magnet as the float, sustained by the liquid in said tank, rises and falls within said tube, and a pivoted magnetic needle within the chambered head and wholly disconnected from said magnet and rotated wholly by the magnetic influence of the magnet.

14. In a fluid-gage for indicating the amount of fluid in a tank, a magnetic needle, means to sustain the same, a float guide extended from said needle sustaining means, a plate located at the upper end of said float guide, a shaft, a magnet mounted on said shaft, a float guided by said float guide and turning said shaft, said plate sustaining the weight of said shaft and its connected magnet.

15. In a fluid-gage for indicating the amount of fluid in a tank, a revolubie magnetic needle, means to sustain the same, a float guide, a plate at the upper end of said float guide provided with an opening, a shaft extended through said opening in said plate, a float coacting with said float guide and shaft and the said parts so constructed that the shaft is turned by the float as it rises and falls, a magnet applied to said shaft above said plate, the latter sustaining the weight of said shaft and magnet, and a cap applied to the lower end of the float guide, said cap receiving loosely and contralizing the lower end of said shaft.

16. In a fluid-gage, a head, a float guide threadably connected with said head and provided at its upper end with a plate, a shaft, a magnet applied to the upper end of said shaft, a collar on said shaft below said magnet and bearing on said plate to sustain the weight of the shaft and magnet, a float embracing said shaft and coacting with said float-guide, said parts so constructed as to turn said shaft and magnet as the float rises and falls, a pivot in the outer end of said head, and a magnetic needle mounted on said pivot, said magnet in its rotations turning said magnetic needle in unison therewith.

17. In a fluid-gage, a float-guide provided with a plate in the upper portion thereof, an impervious gage head having a magnetic needle pivoted in the outer end thereof, a shaft sustained by said plate at the upper end of said float-guide, a permanent magnet connected with said shaft above said plate and a float surrounding said shaft, said float coacting with said float-guide, said parts so constructed as to turn said shaft and its magnet as the float rises and falls, the magnet turning with itself said magnetic needle.

In testimony whereof, I have signed my name to this specification in the presence of two subscribing witnesses.

MORRIS MARTIN.

Witnesses:
ELIZABETH R. MORRISON,
EVANGELINE C. BROWN.